United States Patent
Baligh et al.

(10) Patent No.: US 11,184,165 B2
(45) Date of Patent: *Nov. 23, 2021

(54) SYSTEM AND METHOD FOR CHANNEL SECURITY

(71) Applicant: HUAWEI TECHNOLOGIES CO., LTD., Shenzhen (CN)

(72) Inventors: Mohammadhadi Baligh, Ottawa (CA); Kelvin Kar Kin Au, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 18 days.

This patent is subject to a terminal disclaimer.

(21) Appl. No.: 16/518,181

(22) Filed: Jul. 22, 2019

(65) Prior Publication Data

US 2019/0349761 A1    Nov. 14, 2019

Related U.S. Application Data (63) Continuation of application No. 15/911,732, filed on Mar. 5, 2018, now Pat. No. 10,362,478, which is a continuation of application No. 15/042,942, filed on Feb. 12, 2016, now Pat. No. 9,913,137.

(60) Provisional application No. 62/213,450, filed on Sep. 2, 2015.

(51) Int. Cl.
| | |
|---|---|
| *H04M 1/66* | (2006.01) |
| *H04L 9/08* | (2006.01) |
| *H04L 29/06* | (2006.01) |
| *H04W 12/041* | (2021.01) |
| *H04W 12/069* | (2021.01) |

(52) U.S. Cl.
CPC .......... *H04L 9/0869* (2013.01); *H04L 9/0891* (2013.01); *H04L 63/068* (2013.01); *H04W 12/041* (2021.01); *H04W 12/069* (2021.01); *H04L 2209/80* (2013.01)

(58) Field of Classification Search
CPC ... H04L 9/0869; H04L 9/0891; H04L 63/068; H04L 2209/80; H04L 63/123; H04W 12/0401; H04W 12/0609; H04W 74/0833; H04W 12/04; H04W 12/06; H03W 12/04; Y02D 30/70
USPC ........................................................ 455/411
See application file for complete search history.

(56) References Cited

U.S. PATENT DOCUMENTS

| | | | | |
|---|---|---|---|---|
| 5,402,490 A | * | 3/1995 | Mihm, Jr. ........... | H04L 63/0823 380/247 |
| 7,532,895 B2 | * | 5/2009 | Hrastar ............... | H04W 12/033 455/456.1 |
| 8,073,428 B2 | * | 12/2011 | Khetawat ............. | H04W 16/16 455/411 |
| 8,756,669 B2 | | 6/2014 | Malinowski | |
| 8,830,818 B2 | | 9/2014 | Damnjanovic | |
| (Continued) | | | | |

FOREIGN PATENT DOCUMENTS

| | | |
|---|---|---|
| CN | 1596028 A | 3/2005 |
| CN | 1599485 A | 3/2005 |
| (Continued) | | |

*Primary Examiner* — Mahendra R Patel (57) ABSTRACT

A method for user equipment (UE) identification in a wireless network comprising selecting, at the UE, a sequence from a stored pool of possible sequences based on a stored secret value; and transmitting the selected sequence to the wireless network.

14 Claims, 9 Drawing Sheets

(56) References Cited

U.S. PATENT DOCUMENTS

| | | | |
|---|---|---|---|
| 8,904,181 B1* | 12/2014 | Felsher | H04L 63/0442 713/171 |
| 9,106,407 B2* | 8/2015 | Kipnis | H04L 9/0869 |
| 9,495,190 B2* | 11/2016 | Ellison | G06F 7/588 |
| 2003/0176195 A1 | 9/2003 | Dick et al. | |
| 2005/0113067 A1 | 5/2005 | Marcovici et al. | |
| 2005/0138379 A1* | 6/2005 | Semple | H04W 4/06 713/170 |
| 2005/0240943 A1* | 10/2005 | Smith | G06F 9/465 719/328 |
| 2006/0045271 A1 | 3/2006 | Helbig et al. | |
| 2007/0183386 A1* | 8/2007 | Muharemovic | H04L 5/023 370/344 |
| 2008/0070578 A1* | 3/2008 | Flore | H04W 56/0045 455/438 |
| 2008/0101306 A1* | 5/2008 | Bertrand | H04L 27/2613 370/336 |
| 2008/0120129 A1* | 5/2008 | Seubert | G06Q 10/10 705/35 |
| 2009/0061820 A1* | 3/2009 | Patel | H04L 63/0869 455/411 |
| 2009/0073944 A1 | 3/2009 | Jiang et al. | |
| 2009/0208014 A1* | 8/2009 | Betouin | H04L 9/0662 380/277 |
| 2009/0213968 A1* | 8/2009 | Tormalehto | H04J 11/00 375/343 |
| 2009/0268666 A1* | 10/2009 | Vujcic | H04W 74/0833 370/328 |
| 2010/0220664 A1* | 9/2010 | Hooli | H04L 7/041 370/329 |
| 2011/0086658 A1 | 4/2011 | Baldemair | |
| 2011/0092213 A1* | 4/2011 | Forsberg | H04L 63/06 455/436 |
| 2012/0069933 A1 | 3/2012 | Hao et al. | |
| 2012/0142354 A1* | 6/2012 | Ahluwalia | H04L 5/0055 455/436 |
| 2013/0046821 A1* | 2/2013 | Alanara | H04W 76/27 709/204 |
| 2013/0301611 A1* | 11/2013 | Baghel | H04W 72/04 370/331 |
| 2013/0326603 A1* | 12/2013 | Kato | H04L 9/0866 726/6 |
| 2014/0044083 A1 | 2/2014 | Kim et al. | |
| 2014/0269642 A1* | 9/2014 | Forenza | H04B 7/024 370/337 |
| 2014/0286261 A1* | 9/2014 | Vujcic | H04W 74/0833 370/329 |
| 2014/0293918 A1* | 10/2014 | Vujcic | H04W 48/12 370/329 |
| 2014/0314048 A1* | 10/2014 | Yi | H04W 4/70 370/332 |
| 2015/0016352 A1 | 1/2015 | Bressanelli et al. | |
| 2015/0139424 A1* | 5/2015 | Campagna | H04L 9/3271 380/270 |
| 2015/0181546 A1* | 6/2015 | Freda | H04L 27/0014 370/336 |
| 2015/0264638 A1 | 9/2015 | Han et al. | |
| 2016/0037352 A1* | 2/2016 | Wei | H04W 72/0453 455/454 |
| 2016/0173239 A1 | 6/2016 | Kim et al. | |
| 2016/0174261 A1* | 6/2016 | Yang | H04L 27/261 370/329 |
| 2016/0198455 A1* | 7/2016 | Caretti | H04W 72/042 370/329 |
| 2016/0308650 A1 | 10/2016 | Qu et al. | |

FOREIGN PATENT DOCUMENTS

| | | | | |
|---|---|---|---|---|
| CN | 1672385 A | 9/2005 | | |
| CN | 101094529 A | 12/2007 | | |
| CN | 101606334 A | 12/2009 | | |
| CN | 101771649 A | 7/2010 | | |
| CN | 101924598 A | 12/2010 | | |
| CN | 102119577 | 4/2011 | | |
| CN | 102119577 A | 7/2011 | | |
| GB | 2534928 A | * | 8/2016 | H04J 13/0062 |
| WO | 2014206287 | 12/2014 | | |
| WO | 2014206287 A1 | 12/2014 | | |
| WO | 2015021185 | 2/2015 | | |
| WO | 2015021185 A1 | 2/2015 | | |

* cited by examiner

SYSTEM AND METHOD FOR CHANNEL SECURITY

This application is a continuation application of U.S. patent application Ser. No. 15/911,732 filed on Mar. 5, 2018, now U.S. Pat. No. 10,362,478, which itself is a continuation of Ser. No. 15/042,942 filed on Feb. 12, 2016, now U.S. Pat. No. 9,913,137, which claims the benefit of the priority to U.S. Provisional Application No. 62/213,450 filed Sep. 2, 2015 entitled "System and Method for Channel Security". These applications are incorporated herein by reference.

FIELD

The present invention relates to wireless communications, and, in particular embodiments, to a system and method for providing security in a communication channel.

BACKGROUND

A mobile user equipment (UE) can transmit identifying information in a tracking channel and other channels that allows the UE to be tracked or measured in a network. The identifying information can take the form of a sequence that is applied to a radio signal. By way of example, a Zadoff-Chu (ZC) sequence is a complex-valued mathematical sequence which, when applied to radio signals, gives rise to an electromagnetic signal of constant amplitude, whereby cyclically shifted versions of the sequence imposed on a signal result in zero correlation with one another at the receiver. A Zadoff-Chu sequence with an assigned set of parameters can be used to provide an identifying signal in a network. In some applications, it is desirable to protect identifying information sent by a UE in a network.

SUMMARY

According to an example embodiment is a method for user equipment (UE) identification in a wireless network, comprising: selecting, at the UE, a sequence from a stored pool of possible sequences based on a stored secret value; and transmitting the selected sequence to the wireless network.

According to another example embodiment is a user equipment (UE) device configured to communicate with a wireless network and comprising a processor configured to execute instructions to cause the UE device to: select a sequence from a stored pool of possible sequences based on a stored secret value; and transmit the selected sequence to the wireless network.

According to another example embodiment is a method for tracking user equipment (UE) devices in a wireless network, comprising: assigning sequence parameters for each of the UE devices so that each UE device has an associated pool of sequence parameters; storing a secret value for each of the UE devices; receiving a sequence through the wireless network from a sending UE device; and resolving the sequence based on the stored secret values and the assigned sequence parameters to determine an identity of the sending UE device.

According to another example embodiment is a system for tracking user equipment (UE) devices in a wireless network, the system comprising: a network element configured to exchange information with UE devices that are active in the wireless network, the network element comprising a processor configured to execute instructions to cause the network element to: store for a UE device a pool of identifying sequences and a secret value for the UE device; receive a sequence transmitted from the UE device; resolve an identity of the UE device based on the pool of identifying sequences and the secret value.

BRIEF DESCRIPTION OF THE DRAWINGS

Reference will now be made, by way of example, to the accompanying drawings which show example embodiments of the present disclosure, and in which.

DETAILED DESCRIPTION

The structure, manufacture and use of example embodiments are discussed in detail below. The specific examples discussed are merely illustrative of specific ways to make and use embodiments of the invention, and do not limit the scope of the invention.

Example embodiments are described herein for protecting identifying information sent by user equipment (UE) in an "always on" network.

Figure 1:
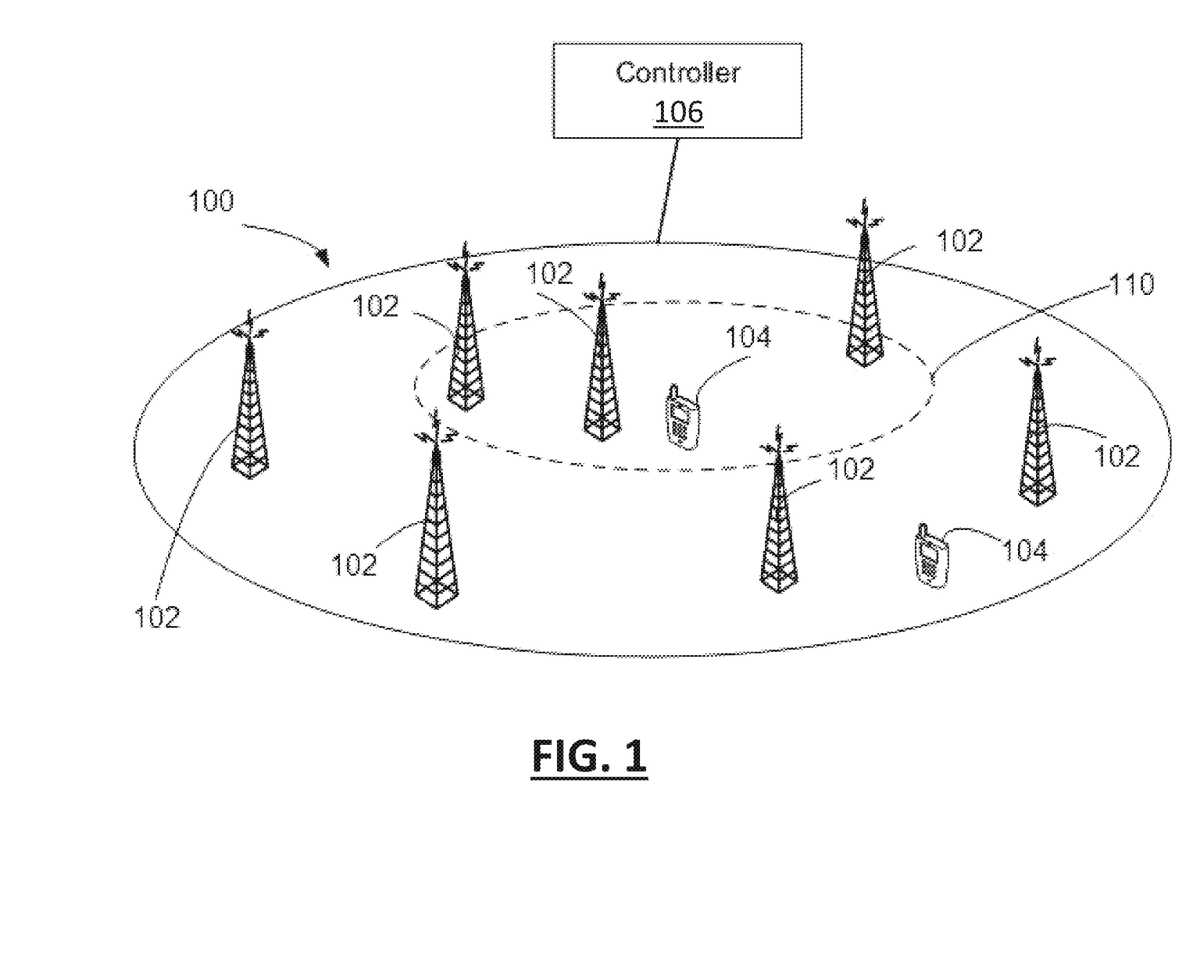
FIG. 1 illustrates an example of a wireless communications system according to example embodiments.

FIG. 1 illustrates a wireless communications network 100 to which the tracking channel security procedures described herein can be applied. In example embodiments, network 100 is UE-centric in that network communications are organized around a Dedicated Connection ID (DCID) associated with a User Equipment (UE) device 104, in contrast to a conventional cell approach in which a cell ID is used to design the air interface and UE and transmit point (TP) association is based on the cell ID detected by the UE. In this regard, UE-centric network 100 employs an air interface design to support non-cellular based wireless access.

In an example embodiment, the communications system of FIG. 1 includes communications network 100 that is made up of a plurality of TPs 102 and a cloud processor or controller 106 in communication with the TPs 102. The TPs 102 enable a plurality of UEs 104 to access the network 100. The TPs 102 may include any component or network node capable of providing wireless access by establishing uplink and/or downlink connections with the UEs 104, such as a base transceiver station (BTS), a NodeB, an evolved NodeB (eNB), a femtocell, or other wirelessly enabled devices. The UEs 104 may comprise any component capable of establishing a wireless connection with the TPs 102. The TPs 102 may be connected to controller 106 via a backhaul network (not shown). The backhaul network may be any component or collection of components that allow data to be exchanged between the TPs 102 and the controller 106 and/or a remote end (not shown). In some embodiments, the network 100 may comprise various other wireless devices, such as relays, femtocells, etc. The controller 106 may be any type of data processing system capable of performing the processes disclosed below and capable of communication with other devices.

In network 100, the TPs 102 are not associated with a conventional cell. Rather, the controller 106 organizes the TPs 102 into logical entities or hypercells 110. Each UE 104 is assigned to a hypercell 110 and is assigned a unique UE DCID. In an embodiment, the UE 104 can be a mobile phone, a sensor, a smart phone, tablet, computer, or other wireless device. The UE 104 may move freely within an area serviced by a single logical entity 110 without acquiring a new UE DCID. Each TP 102 monitors signal strengths for any UE 104 detectable by the TP 102 and sends this data to the controller 106. The controller 106 creates a logical entity 110 or determines the identity of a logical entity 110 to be assigned to serve each UE 104 according to the signal strengths measured by the TPs 102. This determination can be performed dynamically in some embodiments. In some examples, the controller 106 assigns a logical entity ID (also referred to as a hypercell ID) to the logical entity/hypercell 110 and assigns a UE DCID to each UE 104. In some examples, a full UE ID is assigned by the controller to each UE that is a combination of the UE DCID and the hypercell ID.

In some examples, the controller 106 selects one of the TPs 102 from the group of TPs 102 in the hypercell 110 to provide network access to a UE 104. In an embodiment, the controller 106 selects the TP 102 based on relative signal strengths of the UE 104 at each of the TPs 102 in the logical entity 110 and/or the loads of each TP 102 in the hypercell 110. In other embodiments, other selection criteria can be utilized. In an embodiment, the controller 106 dynamically reassigns a new TP 102 in the hypercell 110 to serve the UE 104 based on changes to the signal strength of the 104 UE at each TP 102 in the hypercell 110. The change in signal strength may be due to UE mobility or to other factors. In an embodiment, the controller 106 can enable or disable one or more TPs 102 covered by a hypercell 110 to reach a tradeoff between the service quality provided to all covered UEs 104 and energy saving or other criteria. In an embodiment, the TPs 102 assigned to a hypercell 110 may be changed dynamically by the controller 106 according to changes in network conditions.

Figure 2:
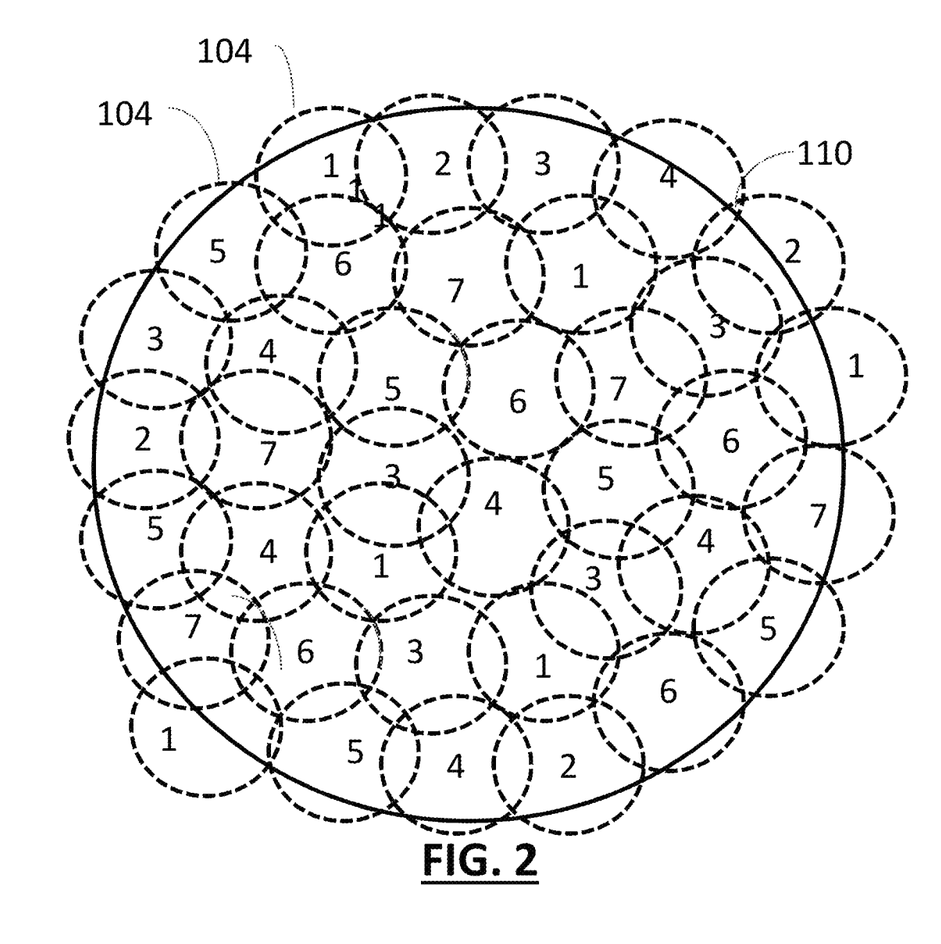
FIG. 2 illustrates an example of a logical entity or hypercell of a network of the system of FIG. 1.

FIG. 2 illustrates a hypercell coverage area associated with hypercell 110 (depicted with a solid circle). In at least some example embodiments, the TPs 104 (each depicted as a dashed circle in FIG. 2) of hypercell 110 are associated with different zones, with at least some TPs 104 that do not have common coverage areas within a hypercell 110 being assigned to common zones. In this regard, FIG. 2 illustrates hypercell 110 divided into zones 1-7; each zone includes multiple TPs 104 that are located in geographically separated regions or areas. Such a configuration can facilitate the reuse of resources in different areas of hypercell 110.

In example embodiments, the network 100 is configured to support different operating states for UE 104, with each operating state supporting different levels of UE functionality. In particular, in one example UE 104 is configured to transition between two different states, namely an "active" state and an energy economizing "ECO" or "standby" state. In example embodiments, a reduced set of UE functionality is supported in the standby state compared to in the active state, however at least some degree of connectivity to the network 100 is supported in both states such that UE 104 maintains an always-on connection to the wireless communications network 100. As a result of the always-on connection, the DCID for a UE 104 is used during both active and standby states. In at least some example embodiments, the reduced set of UE functionality supported in the "standby" state reduces one or more of power consumption at the UE 104 and network resources allocated to the UE 104.

In example embodiments, the DCID (which may, in some examples, be 16-20 bits in length) assigned to a UE 104 within the hypercell 110 may contain multiple fields such as user type, zone, and UE ID in the zone, among other things. Multiple signaling, control and data channels may rely on the DCID, including for example the tracking channel (TC) and physical downlink control channel (PDCCH). The DCID for a UE 104 may be assigned during an initial access procedure 210 that is supported by UE 104 in the active state. In an example initial access procedure, UE 104 searches for a synchronization signal associated with logical entity 110 (Hypercell ID); UE 104 accesses the hypercell 110 of system 100 via a pre-defined default frame structure; UE 104 obtains DL synchronization via a sync channel; UE 104 uses Physical Random Access Channel (PRACH) for initial access; and network controller 106 authenticates UE 104 and assigns a UE DCID. At the conclusion of the initial access procedure, the UE 104 is provided with a Hypercell ID (i.e. an ID for logical entity 110), a UE DCID, and a UE-centric sequence. The UE DCID combined with hypercell ID is the full user ID in the network 100.

In example embodiments, a UE 104 can be identified by the network based on a transmission sequence used in a communications channel such as the access channel by the UE 104. By way of example, the sequence assignment for a particular UE 104 may be done according to Zadoff-Chu (ZC) sequence parameters. The sequence assignment may assign ZC sequences from a pool of possible sequences of the same length, on the same resource set, with the following parameters:
  a. BW: total bandwidth allocated for the sequence pool in one group in one time-frequency (TF) resource
  b. T: total time allocated for sequence consisting of three parts. ($T=T_S+T_{CP}+T_G$)
  c. $T_S$: Actual sequence time
  d. $T_{CP}$: Cyclic prefix time (should be more than maximum delay of the channel plus maximum timing mismatch)
  e. $T_G$: Guard time at the end of the sequence (same requirement as $T_{CP}$), all the UEs remain silent In example embodiments, the ZC sequences can be described by the following parameters:
  a. $N_{ZC}$: Zadoff Chu prime number (a prime number less than $BW \times T_S$)
  b. Each time can be normalized by the $N_{ZC}$. For example, $T_{CP}=N_{CP}/N_{ZC}*T_S$
  c. $R_u$: Root of the sequence for different users (some users may have the same root)
  d. $CS_u$: Cyclic shift for each sequence (users with the same root should have CS difference larger than $BW \times \Delta T$, $\Delta T$ is the maximum allowed total channel delay and timing mismatch)
  e. A sequence for a particular UE 104 is defined by $S_u=\exp(j\pi R_u)n-CS_u)(n-CS_u+1)/N_{ZC})$ for n=0, . . . , $N_{ZC}-1$ The sequence $S_u$ is mapped to $T_S$. In OFDM based transmission (as an example), carrier spacing would then be defined by $1/T_S$.

The UE 104 can transmit the sequence $S_u$ to a TP 102 to identify the UE 104 to the network. Different UEs 104 may share the same sequence but in different time/frequency resources, or different geographical locations to uniquely identify the UEs.

In at least some embodiments, network 100 employs a large number of network nodes, user terminals, sensors, and virtualization such that the UE 104 connects to a network hypercell 110, not an individual cell. In an always-connected environment, a fast transition from the standby state to the active state is desired. In standby state, the UE 104 retains its connection to the network 100 and its UE DCID and UE specific sequence assignment, and thus can quickly reestablish the Active state.

In example embodiments, the UE DCID maps to a certain sequence/resource in the access channel. The UE utilizes the sequence/resource to initiate a buffer status report (BSR), keep alive (i.e., keep on) signaling, and synchronization refinement.

With respect to the resource and sequence provision, as noted above the network 100 is divided into hypercells 110, and the hypercells may overlap. In addition, multiple resources in frequency and time are allotted for the tracking channel (TC) in each hypercell 110. The total allotted resources are selected based on the expected access loading and available BW. These resources are divided into multiple groups. In each group, a set of possible sequences is provisioned (i.e. the sequence pool). The size of the set and the parameters are optimized based on the expected number of simultaneous active users in the group, the number of standby users in the group, the detection computational capabilities of the network, the maximum round trip delay for sequences in the group, and the target miss and false alarm rate. In an example embodiment, the resource and sequence pool are used in an access channel that supports the TC and the initial access channel (for example, a channel similar to LTE PRACH).

Opportunities in the pool of sequences include $N_{zc}-1$ total roots, and up to $N_{ZC}$ total shifts for each root. The sequence pool size optimization is based on multiple criteria such as the total number of users in the pool, the total number of expected active users per access channel resource, the maximum affordable computational complexity, the maximum round trip delay, and the maximum overhead allowed for allocated TF resources.

Tracking channel applications according to embodiments serve a keep alive purpose, a UE wakeup purpose, and a positioning purpose. The keep alive purpose allows a UE 104 to periodically or on a need basis use the access channel to update its timing/power control. The network also uses information received through the tracking channel, including sequences $S_u$ from UE 104 to track the location of the UE 104, update a user specific network nodes (NN) set, and reassign a user ID or type if needed. For the UL wakeup purpose, the user may on a need basis send a preamble to start a UL communication. Use of the TC for the positioning purpose is implementation-specific.

The use of a fixed UE DCID and ZC sequence in an "Always-on" environment enables quick state transition from standby state to active state, however in some configurations this may impose a security risk. In particular, it is conceivable that the sequence may be used in an unauthorized manner by a third party for one or more of: unauthorized tracking of UE movement and activity by a third party; impersonation of a UE by a third party; and unauthorized access to data contained in UE communications.

Example embodiments are described which may be applied individually or may be combined. One embodiment includes encryption of the vulnerable channels such as the TC and PDCCH, that rely on UE DCIDs, using known encryption techniques. Another embodiment is for the network to frequently update the UE DCID (after authentication) when the UE is in the active state, at the time of "wakeup" (i.e. transition from standby to active State) and/or on a demand basis in the standby state. Another solution is to untie the DC sequence parameters for a UE from the UE DCID and instead use a pseudo random generator to determine the ZC sequence parameters.

Encryption

Figure 3:
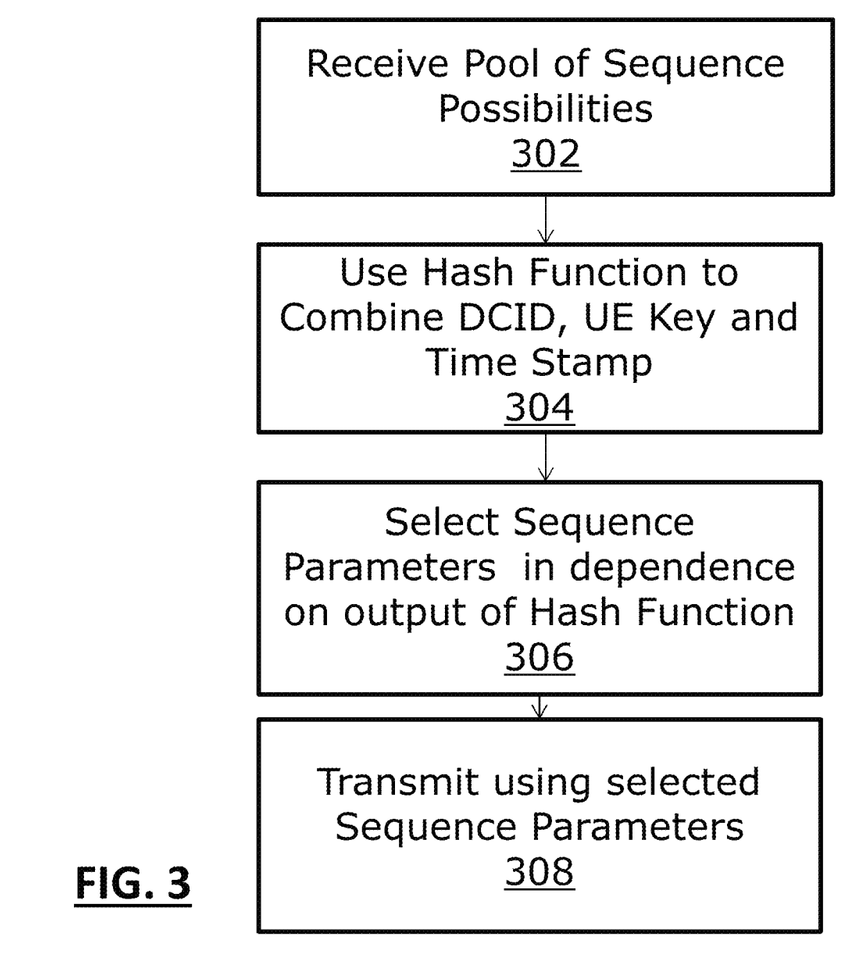
FIG. 3 is a flow diagram illustrating an encryption process applied at a user equipment device in the system of FIG. 1, according to example embodiments.
Figures 4A, 4B:
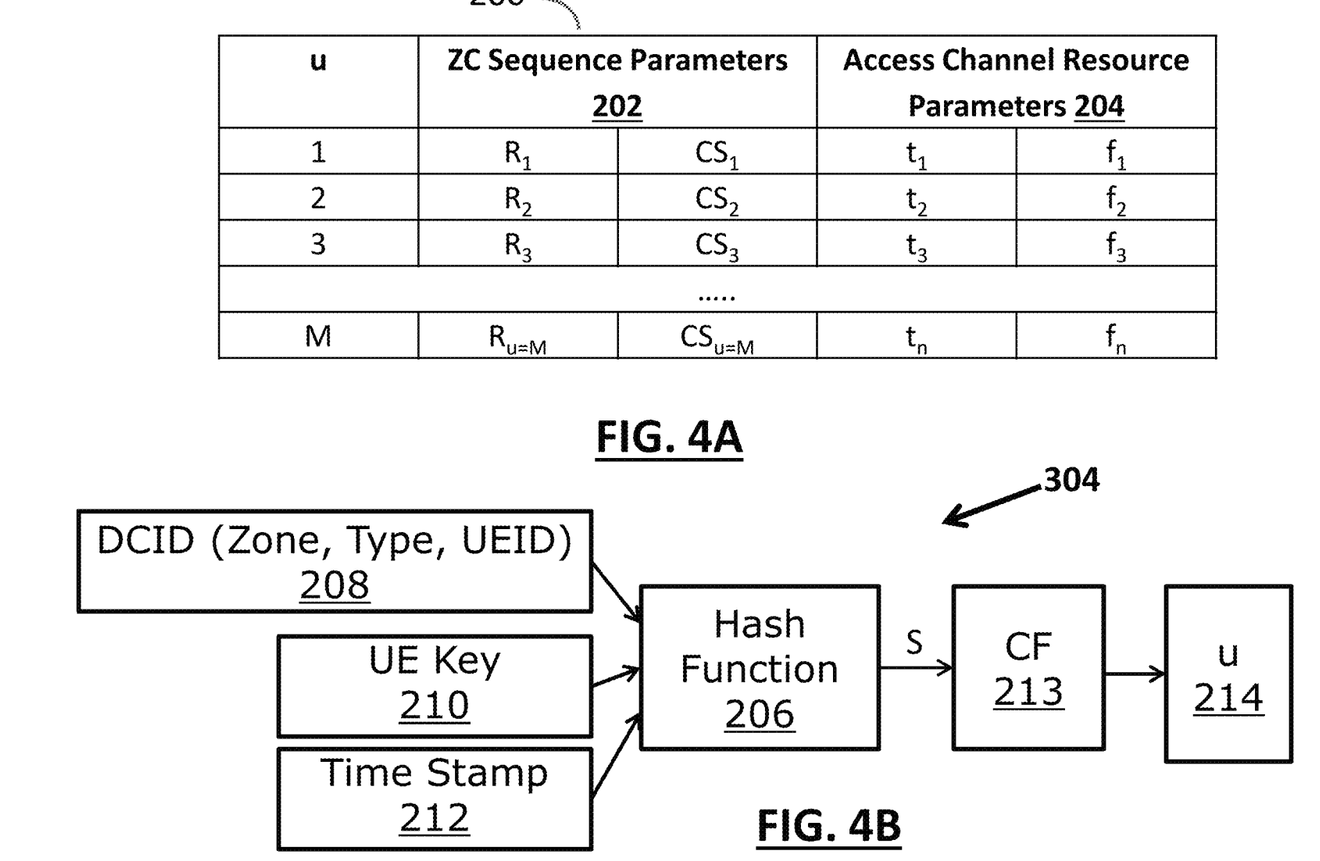
FIG. 4A is a table representing a pool of sequences assigned to a device.
FIG. 4B is a block diagram representing a hash function for selecting a sequence from the pool of FIG. 4A.

In an example embodiment, the ZC sequence $S_u$ used by UE 104 is hashed based on a key, a time stamp and the UE DCID. FIG. 3 illustrates an example of an encryption process applied at UE 104. As indicated at Action 302, each UE 104 is provided with, and stores, a pool of possible sequence parameters and resource parameters. FIG. 4A illustrates an example of a stored sequence and resource pool 200 in the form of a look-up table. For example, the pool 200 may include multiple sets of ZC sequence parameters 202 1 to M, with each set having an associated root value $R_u$ where $(1<=u<=n)$ and cyclic shift value $CS_u$ where $(1<=u<=n)$. The pool 200 may also define access channel time and frequency resource parameters 204 $t_u$, $f_u$ that are associated with the ZC sequence parameters. In some embodiments, the same time and frequency resources may be associated with multiple sets of ZC sequence parameters 202. As will be described in greater detail below, the sequence pool 200 assigned to UEs that are associated with a hypercell may be selected by the network 100 to reduce the number of possible contentions among UEs in the hypercell.

In some example embodiments, the sequence pool 200 provided to a UE 104 is pre-provisioned on the UE 104 during pre-delivery device configuration. The sequence pool 200 may conform to a standard in the jurisdiction that the UE 104 is intended to be used in. In some embodiments, the sequence pool 200 is provided to device 104 after it has been delivered to the end user. In some embodiments, sequence pool updates are pushed to UE 104 by the network at regular intervals or upon the occurrence of predetermined events.

As indicated in Action 304, and represented in FIG. 4B, the UE 104 employs a predetermined hash function 206 to combine its UE DCID 208, a time stamp 212, and a unique UE key 210. In example embodiments, the UE key 210 is provided to the UE 104 from the network 100 and may be periodically updated. In some examples, UE key 210 may be generated at the UE 104, and may be provided by the UE 104 to the network 100. Thus, in example embodiments, the UE key 201 is a secret value that is known by and shared between the UE 104 and the controller 106. The time stamp 212 may be derived from the network 100 or an external source such as a GPS source and may, for example, be implemented by a counter that continually increases as a function of time and that is reset each time the UE key 210 is reset.

As noted above, in the illustrated embodiment, the sequence pool 200 includes M sets of sequence parameters 202. In example embodiments, hash function 206 is a mathematical algorithm that performs one or more operations on the input values UE DCID 208, time stamp 212 and UE key 210 to generate a random string S that is than converted by a conversion function (CF) 213 to an output (u)

214 that is a number from 1 to M. Output (u) 214 maps to a set of sequence parameters $R_u$, $CS_u$ in pool 200. In an example embodiment, conversion function CF 213 determines the modulo M of string S which, in the case where S is much greater than M, will effectively provide an output (u) 214 that falls within a regular random distribution from 1 to M. However, other conversion methods can also be used to convert the string S to a number between 1 and M.

As indicated at Action 306, the output (u) 214 of the hash function 206 is used to select the sequence parameter set $R_u$, $CS_u$ to be used by the UE 104 from the pool 200 of sequence possibilities 202. The hash function output may also be used to select access channel resource time and frequency parameters $t_u$ and $f_u$ from the possible resource parameters 204. As indicated at Action 308, the selected sequence parameters are then applied to a radio signal sent by the UE 104 to transmit an identifying sequence $S_u$ for the UE 104 to the network. In an example embodiment, the selected sequence $S_u$ is used in the TC (which in at least some embodiments is implemented in the access channel), but can also be used in other channels.

The Actions 304 to 308 may be repeated. For example, Actions 304 to 308 may be performed for each transmission made by the UE 104 so that the sequence $S_u$ changes with each transmission. In some cases, Actions 304 and 306 could be performed periodically or after a set number of transmissions. The process of FIG. 3 mitigates against an unauthorized third party locating or following the UE 104 or impersonating the UE's next transmission sequence. With regard to setting the pool 200 of sequence possibilities (Action 302), the pool may be updated periodically or upon the occurrence of predetermined conditions. For example, the pool 200 of sequences may be updated if the location or speed of the UE 104 changes, or the UE DCID changes, or the number of UEs in the hypercell changes, or combinations thereof.

It will be appreciated that because the UE DCID is used in the hash function, changing the DCID will also change the hash function output. Accordingly, in some examples the UE DCID may be periodically updated or changed based on predetermined conditions. For example, the UE DCID may be updated if the location or speed of the UE 104 changes, or the number of UEs in the hypercell changes, or after a duration of time, or combinations thereof.

On the network side, when a TP 102 receives an identifying sequence $S_u$ from a transmitting UE 104, the received sequence $S_u$ is resolved by the network 100 to identify the DCID of the sending UE 104. In example embodiments, the sequence pools 200 assigned to different UEs 104 may be identical or include an overlap in possible sequence parameters. Accordingly, in at least some applications, merely selecting the sequence $S_u$ from the pool of possible sequence parameters based on a hash of DCID, time stamp and a key will not guarantee that each UE 104 uses a unique sequence. In particular, two users with different DCIDs but the same possible sequence pool 200 may use the same sequence $S_u$. Accordingly, in at least some applications, further action than simply mapping a received sequence $S_u$ to a possible DCID may be required on the network side to resolve or avoid possible resource contentions. In at least some examples, the network 100 will be aware of which UEs 104 may have the same sequence $S_u$ and will need to resolve the contention if a collision happens. Accordingly, in at least some examples, a contention solution can be based on last tracking channel localization and estimation of the location from which the contentious sequence originated to resolve the contention. The network may send a retransmit request to the contending UEs so that they are unlikely to collide in the next transmission. The tracking response from the network may also be used to resolve collisions. In some examples, the tracking response may include information to identify the UE that wins the contention.

To provide context for contention solutions, a contention probability scenario will be described. In this example, N UEs 104 are using the exact same pool 200 of sequences, there are M sequences in the pool 200, and the probability of each UE 104 being active (i.e. actively transmitting a sequence, which can be done in a standby mode) is p. The number of active sequences can be approximated as a Poisson distribution with mean Np. In such a scenario, a contention only happens if a sequence in the pool 200 is actively used in a transmission by a UE 104 while another UE 104 shares the same sequence. The probability of such an occurrence is $1-(1-1/M)^{N-1}$. If M>>N, then this probability is approximately N/M. The total number of contentions is a Poisson random variable with mean $N_p[1-(1-1/M)N^{-1}]$. For M>>N, this is approximately $N^2p/M$.

Accordingly, selecting an M (number of sequences in the pool 200) much bigger than N (number of UEs 104 using the same sequence pool 200) will keep the probability of contention low. Such a ratio does not increase complexity, because detection required on the network side can be limited to a sequence subset which is at most of size N. Possible contentions can also be reduced by taking geographically resolvable contention into account.

In the context of pool size and contention rate, the number of roots is $N_{zc}-1$, and the number of cyclic shifts is $N_{ZC}/N_d$ ($N_d$ is the minimum cyclic shift delay). In an example embodiment, hypercell 110 can have more than 10,000 possible sequences with $N_{ZC}$ chosen similar to that of LTE. The average number of contentions is proportional to the active probability p and inversely proportional to the pool size M, as illustrated by the following examples:

Example 1: M=10000, N=500, p=0.1, on average in each hypercell 50 sequences are active but only about 2.5 contentions on average to be resolved.

Example 2: M=100000, N=1000, p=0.05, on average in each hypercell 50 sequences are active but only about 0.5 contentions on average to be resolved.

Although M is selected to be much greater than N in the above examples, a smaller M could be used including an M that is less than N, although a smaller M increases the chances of a collision occurring.

Accordingly, in an example embodiment, the network 100 is configured to minimize contentions by configuring sequence pool allocations to UEs 104 based on factors such as UE device type and geographic location. By way of example, as noted above in respect of FIG. 2, in some embodiments a hypercell 110 can be partitioned into zones (Zones 1-7) for serving UEs that fall within specified type classifications that may, for example, include: stationary sensor UEs, low speed UEs, and high speed UEs.

With respect to sequence pool allocation based on device type, stationary sensor UEs 104 have a constant location and generally use tracking only for "keep alive" purposes. Accordingly, for purposes of contention reduction, the sequence pools allocated to stationary sensor UEs 104 can be allocated geographically such that resource sets can be reused in geographically separated locations within a hypercell 110. For example, sensor UEs that are located in Zone 1 regions of hypercell 110 are each allocated a first sequence pool 200, sensor UEs that are located in Zone 2 are each allocated a second, different sequence pool 200, and so on.

In the case of stationary sensor UEs, the ZC sequence parameters can remain constant for some time or follow a pseudo random cycle.

In respect of low speed mobile UEs 104, the UEs can be divided into groups of maximum size N (for example, maximum tolerable collision rate may determine this value), and a pool 200 of M possible sequences can be assigned to each group. The pool sequences assigned to each group differ in the root/CS/resource from each other. The same pool 200 can be used in zones that are geographically removed from each other in the hypercell. In respect of high speed mobile UEs, a similar assignment of sequence pools to groups of devices may be used, however reuse of pools 200 in geographically separate regions may be avoided, or the degree of separation between the regions expanded, depending on the hypercell conditions.

Figure 5:
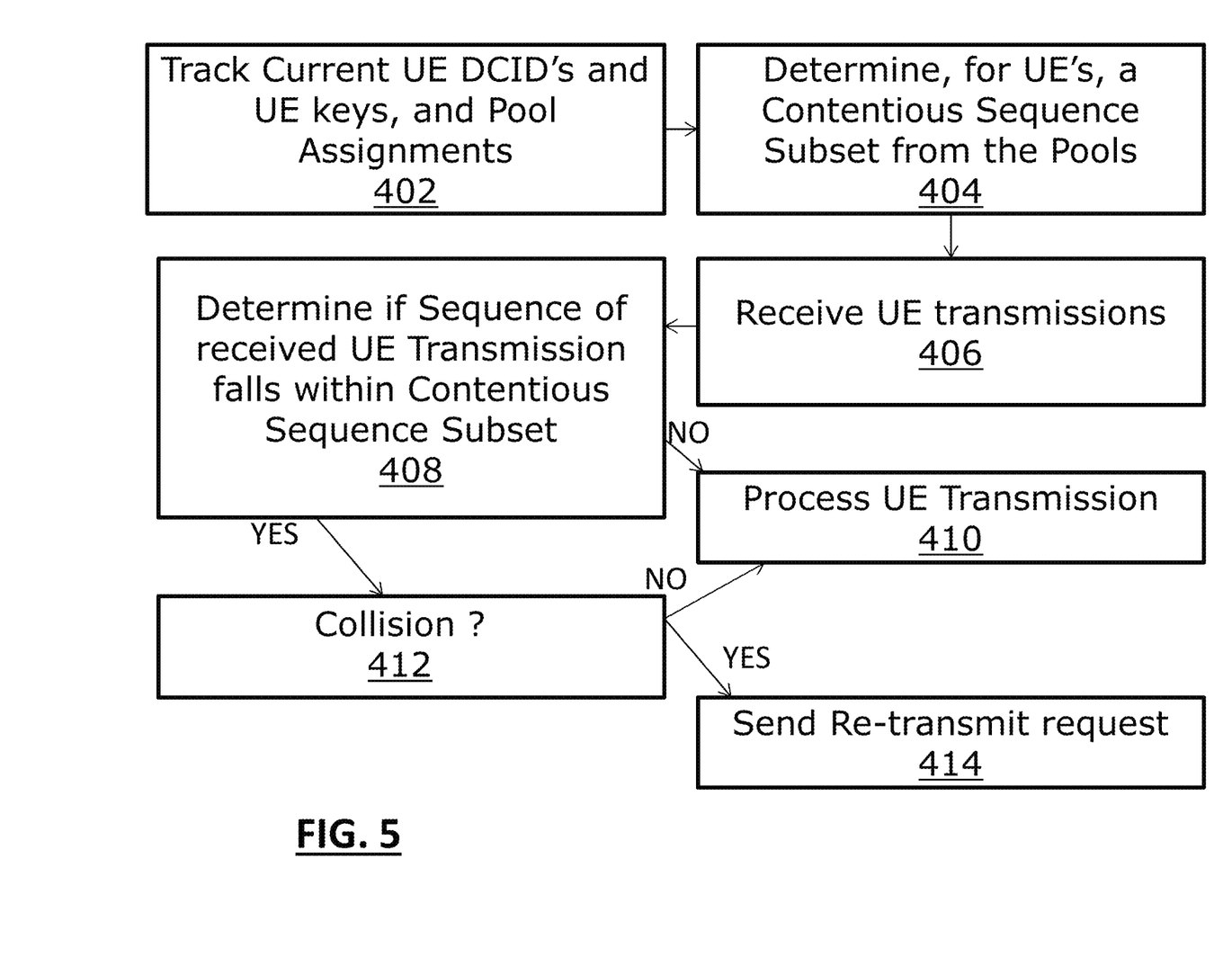
FIG. 5 is a flow diagram illustrating a decryption process applied on the network side in the system of FIG. 1, according to example embodiments.

FIG. 5 shows an example of network side processing for UEs 104 in a hypercell 110, which could, for example, be performed by a network entity such as controller 106, a TP 102 or other network node, or combinations thereof. In example embodiments, the potential contention rate within a hypercell 110 is controlled using the sequence pool allocation methods described above. However, a potential for collisions still exists. As indicated in Action 402, the network 100 tracks all UE DCIDs and UE keys for UEs 104 within the hypercell 110. Additionally, the network 100 tracks what sequence pools 200 have been assigned to the UEs 104. As indicated in action 404, the network 100 determines and tracks, based on the known sequence pool assignments and knowledge of what sequences are currently active, a contentious sequence subset that includes the sequences for which there is a current possibility of a sequence collision occurring within the hypercell 110. As indicated in Actions 406 and 408, when a sequence transmission from a UE 104 is received, the network 100 determines if the sequence $S_u$ used for the incoming transmission falls within the contentious sequence subset. If the received sequence $S_u$ has not been flagged as a possibly contentious sequence, then the UE transmission is processed to resolve the identity of the sending UE (Action 410), as will be described in greater detail below.

In the event that the received sequence falls within the contentions sequence subset, the network will attempt to determine if a collision did or did not occur, for example by referencing last tracking channel localization and estimation of the whereabouts of the contentious sequence to resolve the contention (Action 412). If the network 100 can conclusively determine that a collision did not occur, then the transmission will be processed (Action 410). However, if the network 100 cannot conclusively rule out a collision, then a re-transmit request is sent to the potentially contending UEs 104 (Action 414). It is noted that two UEs contending for the same sequence in one time slot are highly unlikely to contend for the same sequence in the retransmission time slot.

Figure 6:
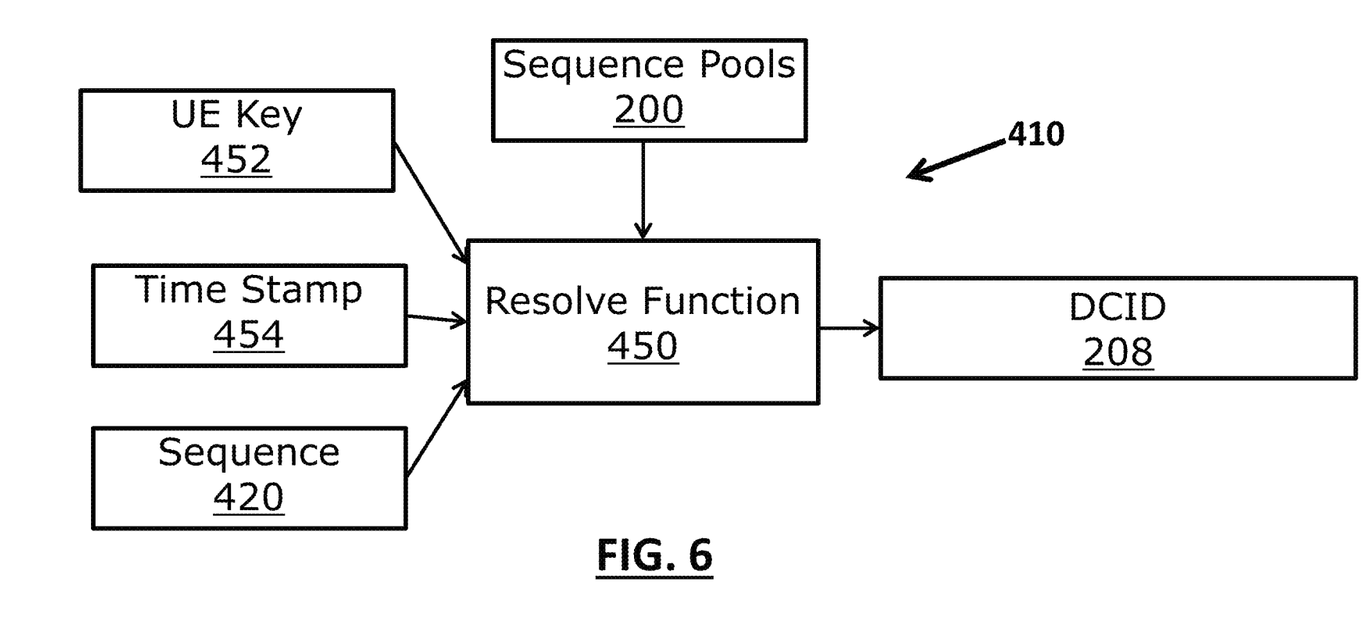
FIG. 6 is a flow diagram illustrating resolution of a device identity by the network.

Referring now to FIG. 6, the processing of a received sequence $S_u$ (Action 410) to resolve the identity of the sending UE (action 410) will now be described according to example embodiments. As a result of contention detection and resolution actions 408, 412, any received sequence $S_u$ 420 processed at action 410 will uniquely point to a specific UE 104. In an example embodiment, a time stamp 454 is assigned to the sequence $S_u$ 420 to identify the time at which the sequence $S_u$ 420 is received by the TP 102. The time stamp 454 and sequence 420 are provided to a resolve function 450, along with the UE keys 452 for all UEs 104 that could have transmitted the sequence. The TP generated time stamp 454 and UE generated time stamp 212 are sufficiently synchronized such that based on the inputs 452, 454 and 420, and access to information about currently assigned sequence pools 200, the resolve function 450 is enabled to determine the DCID 208 of the UE 104 that sent the sequence 420.

Pseudo Random Generator

Figure 7:
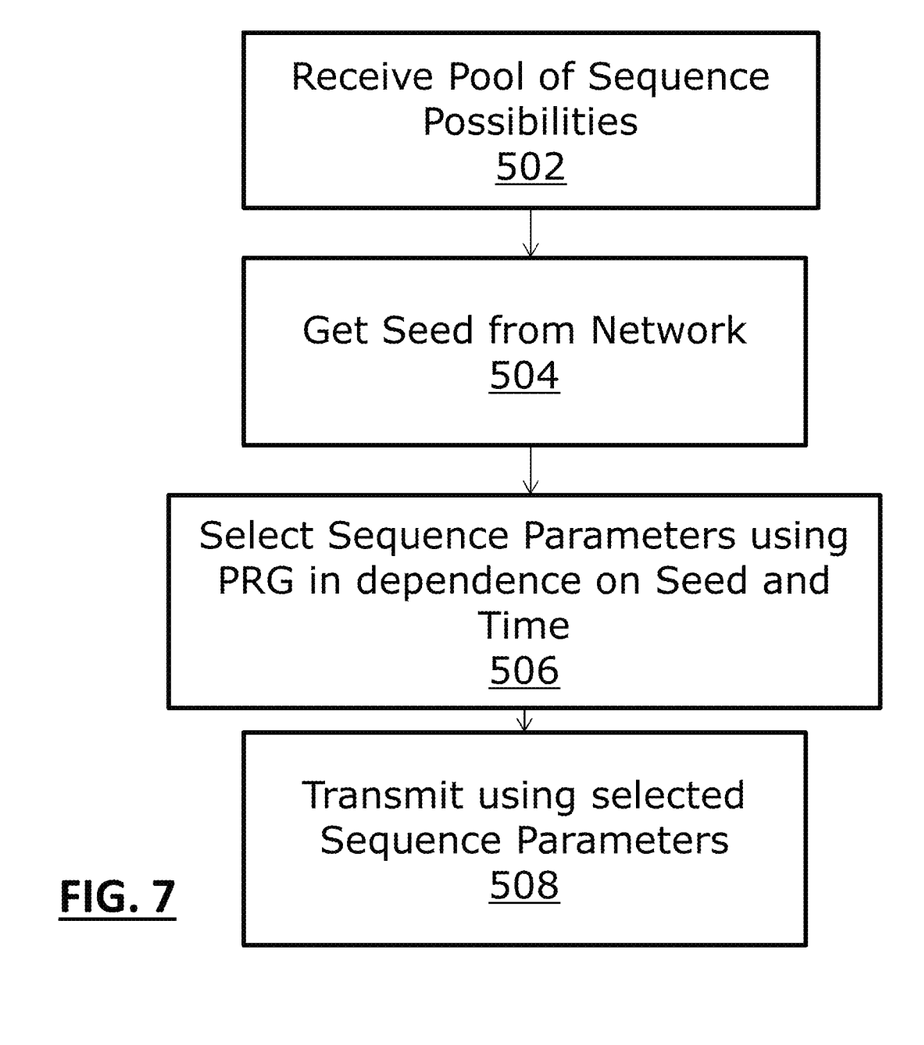
FIG. 7 is a flow diagram illustrating a sequence selection process applied at a user equipment device in the system of FIG. 1, according to example embodiments.
Figure 8:
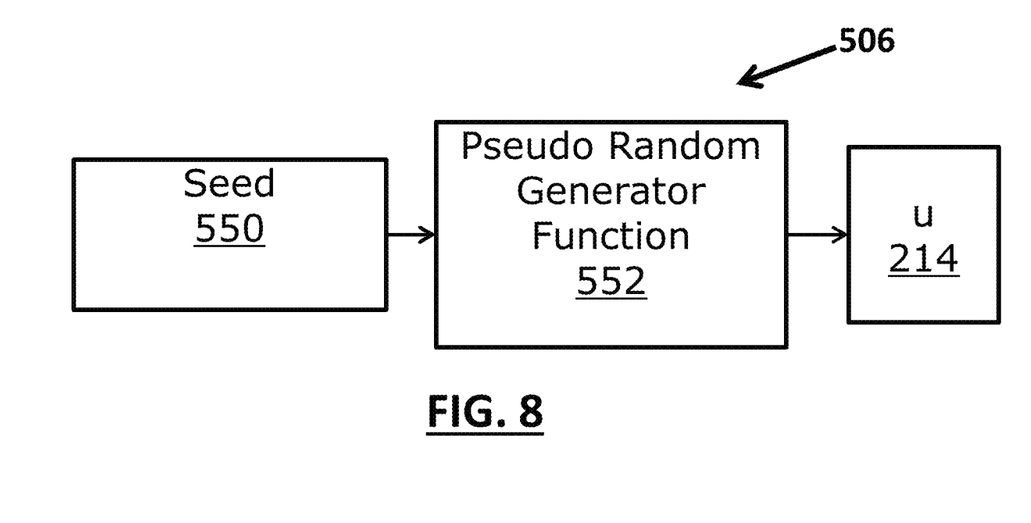
FIG. 8 is a block diagram representing a pseudo random generator function for selecting a sequence from the pool of FIG. 4A.

As indicated above, an alternative channel security solution is to untie the DC sequence parameters for a UE 104 from the UE DCID 208 and instead use a pseudo random generator to determine the ZC sequence parameters. FIG. 7 illustrates an example of pseudo random selection process applied at UE 104. The process of FIG. 7 is similar to that described above in respect of FIG. 3 with the exception of differences that will be apparent from the following description. As indicated at Action 502, each UE 104 is provided with a pool 200 of possible sequence parameters. The sequences included in the pool have been selected by network 100 to reduce potential collisions in the manner discussed above. As indicated in Action 504, UE 104 is provided with a unique seed from the network 100. The seed is a secret value that is shared by the network 100 and the UE 104. In example embodiments, the seed is updated regularly by the network 100. The UE 104 is configured to use the seed in a pseudo random process to select a set of sequence parameters from the sequence pool 200 (Action 506). In particular, as illustrated in FIG. 8, UE 104 is configured with a pseudo random generator (PRG) function 506 that uses the seed and a time value to generate a pseudo random result (u) 214 that maps to a set of sequence parameters in the pool 200. In some example embodiments, the pseudo random generator (PRG) function 506 does not rely on an explicit time stamp input but is configured as a state machine in which each subsequent output is a function of a previously generated pseudo random value and the current seed 550. UE 104 selects a set of sequence parameters from the sequence pool 200 based on the pseudo random result (u) 214, and applies the selected sequence parameters to transmit an identifying sequence $S_u$ to the network (Action 508).

At the network side, the network 100 knows the seeds that it has provided to UEs in the hypercell, the pseudo random generator methodologies applied by the UEs, and the possible sequence pools from which the received sequence is selected. Using this information, the network 100 can resolve the identity of the UE from the received sequence $S_u$. It is noted that use of a pseudo random generator alone will not guarantee uniqueness of sequences among the UEs in a hypercell, however collision mitigating selection of the sequence pools in the manner described above, along with intelligent design of the pseudo random generator, can greatly reduce the contention risk.

Accordingly, in an embodiment that employs pseudo random sequence generation/detection, the identifying sequence $S_u$ sent by a UE in a tracking channel is untied from the UE DCID because the sequence parameters are derived not from DCID, but from another ID (such as a "seed") directly communicated to the UE by the network, which is then used by a pseudo random generator to determine the ZC sequence parameters for the UE. Updating the seed on a regular basis restricts unauthorized use of the sequence $S_u$. In an example embodiment, the network 100 assigns each UE 104 a pool of sequence parameters determined by the network to minimize collisions. The network then assigns to each UE a seed through signaling. When UE needs to transmit an identifying sequence, the UE combines the seed and time (using a pre-agreed method) to select a sequence $S_u$ from the pool, and transmits the selected sequence. The network detects the sequence $S_u$ and resolves possible contentions. Such a method that combines the seed and time stamp in a deterministic manner can provide some control over the collision rate, even possibly avoiding all collisions. However, enough instances of eavesdropping the sequence $S_u$ may allow an attacker to reveal the seed and be able to track or impersonate the UE if the seed is not updated with sufficient regularity.

In contrast, the encryption methodology described above employs an irreversible hash function that combines the UE key and time stamp, with the result that detecting one or few instances of a sequence $S_u$ does not reveal the key. However, the encryption methodology may provide reduced collision control with respect to the pseudo random generator method of FIG. 7. Periodically updating the UE DCID can further improve security.

In addition to providing tracking channel security, one or more of the methods described above can also provide security on other physical or logical channels. In an embodiment, the physical channel is the dynamic control channel used for resource allocation of a UE (e.g. physical downlink control channel (PDCCH) in LTE). In some examples, network 100 uses the UE DCID either directly or indirectly to determine the PDCCH mask for a UE. Accordingly, updating the UE DCID on a regular basis may reduce an attacker's search time for revealing the DCID. Furthermore, even if the DCID is detected, if the sequence selection methods described above are applied, the attacker will not be able to undermine the security of the sequence used by the UE or gain unauthorized access to its data.

Accordingly, in at least some example embodiments, channel security is addressed in network 100 by one or more of: updating the UE DCID on a regular basis (for example every few minutes); and hashing the user-centric sequence in tracking/sounding. In at least some applications, these actions may frustrate an attacker's ability to detect and track a UE's location.

Figure 9:
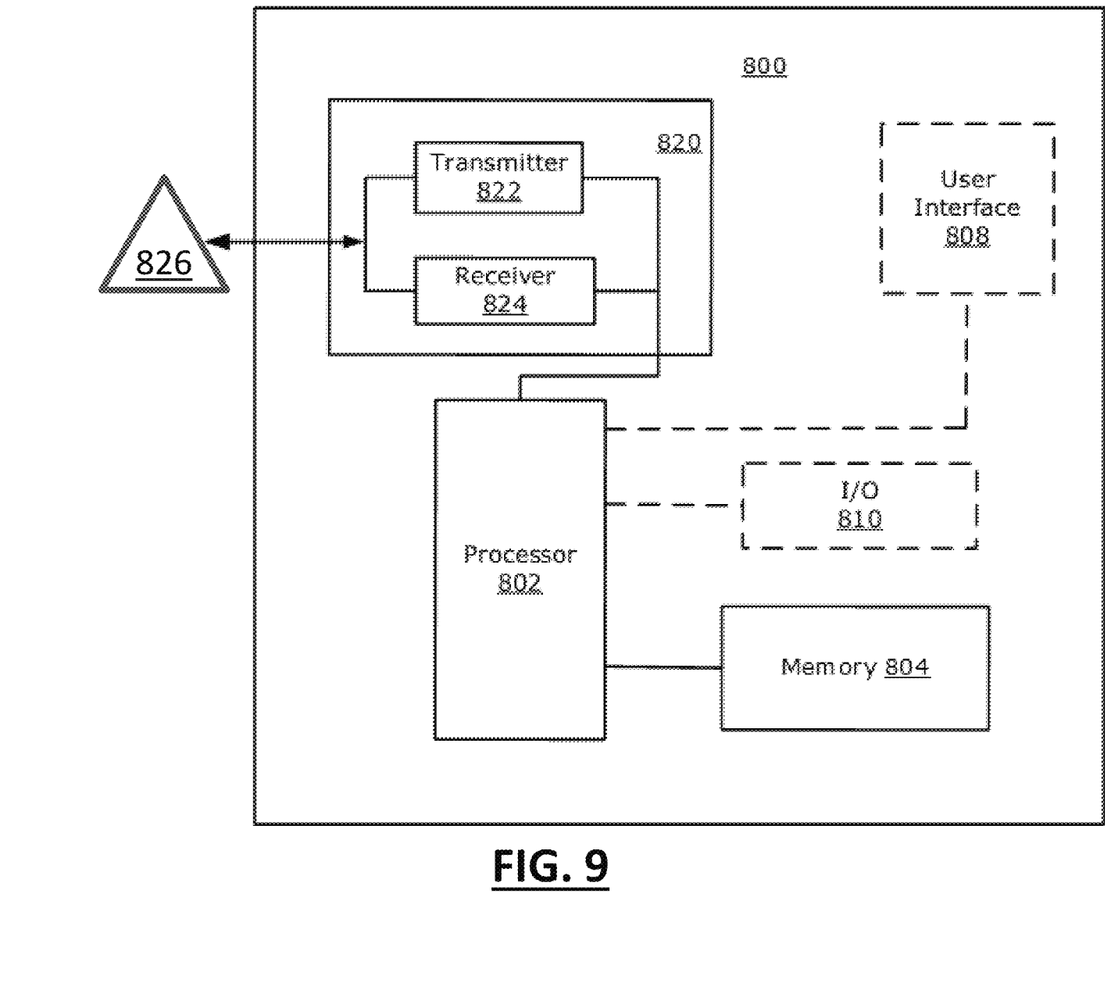
FIG. 9 illustrates a wirelessly-enabled device for implementing embodiments described herein.

FIG. 9 illustrates a block diagram of a wirelessly-enabled device 800 adapted to execute embodiments described herein. The wirelessly-enabled device may be a network-side device (e.g., TP 102, controller 106, base station, relay-station, etc.) or a user-side device (e.g., a user equipment (UE) 104, etc.). As shown, the wirelessly-enabled device 800 comprises a wireless interface 826, a coupler 820, a transmitter 822, a receiver 824, a signal processor 802, and interfaces 808, 810. The wireless interface 826 may include any component or collection of components adapted to transmit or receive a wireless signal. The wireless interface 826 may include a single antenna, multiple separate antennas, or a multi-antenna array configured for multi-layer communication, e.g., single input multiple output (SIMO), multiple input single output (MISO), or multiple input multiple output (MIMO).

The coupler 820 may include any component or collection of components adapted to facilitate bi-directional communication over the wireless interface 826. The transmitter 822 may include any component or collection of components (e.g., up-converter, power amplifier, etc.) adapted to convert a baseband signal into a wireless transmission signal suitable for transmission over the wireless interface. The receiver 824 may include any component or collection of components (e.g., down-converter, low noise amplifier, etc.) adapted to convert a wireless transmission signal received over the wireless interface into a baseband signal. The signal processor 802 may include any component or collection of components adapted to convert a baseband signal into a data-signal suitable for communication over the interface(s), or vice-versa. The signal processor 802 may include or be connected to one or more non-transitory memories 804 for storing instructions and data for use by the signal processor.

The interface(s) may include I/O interfaces 810 that include any component or collection of components that allow the wirelessly-enabled device to communicate/interact with another device, component, or entity. In one embodiment, the wirelessly-enabled device comprises a network-side device (e.g., a base station, etc.), and the interface 810 comprises a backhaul interface that allows the wirelessly-enabled device to communicate with other network-side devices, e.g., neighboring APs, controllers, gateways, etc. In embodiments where the wirelessly-enabled device 800 comprises a user-side device (e.g., a UE), and the interfaces may include a user interface 808 that allows a user or user device (e.g., personal computer (PC), etc.) to interact/communicate with the wirelessly-enabled device 800. In such an embodiment, the user interface 808 may include one or more components for interacting with the user, such as a keyboard, visual display, and audio/video interfaces (e.g., camera, microphone, etc.), and/or one or more wireless and/or wireline interfaces for communicating with a user device, e.g., Universal Serial Bus (USB) port(s), High-Definition Multimedia Interface (HDMI) port(s), Bluetooth interface, etc.

The wirelessly-enabled device 800 may be configured to communicate in accordance with a standard wireless telecommunication protocol. In some embodiments, the wirelessly-enabled device communicates in accordance with a long-term evolution (LTE) protocol. In other embodiments, the wirelessly-enabled device communicates in accordance with another protocol, such as a Wi-Fi protocol defined by Institute of Electrical and Electronics Engineers (IEEE) technical standard 802.11-2012 or 802.11ac-2013.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

What is claimed is:

1. A method for user equipment (UE) identification in a wireless network, comprising:
   receiving, at the UE, a UE key from the wireless network;
   storing, at the UE, the UE key;
   receiving a dedicated connection ID (DCID) for the UE;
   applying a hash function to a combination of the UE key, the DCID for the UE and a time stamp;
   selecting, at the UE, a sequence for identifying the UE from a stored pool of possible sequences based on an output of the hash function; and
   transmitting the selected sequence to the wireless network.

2. The method of claim 1 comprising periodically receiving updated UE keys and DCIDs at the UE.

3. The method of claim 1 wherein:
   the stored pool of possible sequences comprises a table including multiple sets of Zadoff-Chu (ZC) sequence parameters, and
   the output of the hash function maps to a selected set of ZC sequence parameters,
   wherein the selected sequence is a ZC sequence that corresponds to the selected set of ZC sequence parameters.

4. The method of claim 1 wherein the UE is configured to operate in a standby state in which a reduced set of UE functionality is supported relative to another operating state of the UE, wherein the selected sequence is transmitted by the UE while it is in the standby state.

5. The method of claim 1 wherein the selected sequence is transmitted by the UE in a tracking channel of the wireless network.

6. A user equipment (UE) device configured to communicate with a wireless network and comprising a processor configured to execute instructions to cause the UE device to:
   receive, at the UE, a UE key from the wireless network;
   store, at the UE, the UE key;
   receive a dedicated connection ID (DCID) for the UE;
   apply a hash function to a combination of the UE key, the DCID for the UE and a time stamp;
   select a sequence for identifying the UE from a stored pool of possible sequences based on an output of the hash function; and
   transmit the selected sequence to the wireless network.

7. The UE device of claim 6 wherein the processor is configured to execute instructions to cause the UE device to receive the secret value from the wireless network.

8. The UE device of claim 6 wherein the processor is configured to execute instructions to cause the UE device to:
   store the pool of possible sequences as a table including multiple sets of Zadoff-Chu (ZC) sequence parameters, and
   the output of the hash function maps to a selected set of the ZC sequence parameters,
   wherein the selected sequence is a ZC sequence that corresponds to the selected set of ZC sequence parameters.

9. The UE device of claim 6 wherein the processor is configured to execute instructions to cause the UE device to operate in a standby state in which a reduced set of UE device functionality is supported relative another operating state of the UE device, wherein the selected sequence is applied by the UE device while it is in the standby state.

10. A method for tracking user equipment (UE) devices in a wireless network, comprising:
    assigning sequence parameters for each of the UE devices so that each UE device has an associated pool of sequence parameters;
    storing a secret value for each of the UE devices;
    receiving a sequence through the wireless network from a sending UE device, wherein the sequence has been selected by the sending UE device based on the secret value for the sending UE device, a dedicated connection ID (DCID) for the UE device, and a UE time-stamp applied by the UE device;
    applying a time-stamp to the sequence, the applied time-stamp being synchronized with the UE time-stamp;
    resolving the sequence based on the stored secret values, the applied time-stamp, and the assigned sequence parameters to determine the DCID of the sending UE device.

11. The method of claim 10 wherein the sequence is received through a tracking channel.

12. The method of claim 10 comprising:
    determining, based on the assigned sequence parameters and tracked locations of the UE devices, a subset of possible contested sequences;
    upon receiving the sequence, determining if the sequence falls within the subset of possible contested sequences, and if the sequence falls within a subset of possible contested sequences, taking action to resolve any contention.

13. The method of claim 10 wherein the sequence parameters are Zadoff-Chu (ZC) sequence parameters.

14. The method of claim 1 comprising:
    prior to selecting the sequence transmitting the secret value to the wireless network.

* * * * *